(12) United States Patent
Eshraghi

(10) Patent No.: US 7,473,490 B2
(45) Date of Patent: Jan. 6, 2009

(54) FUEL CELL STRUCTURES AND ASSEMBLIES WITH CHANNELED CURRENT COLLECTORS, AND METHOD OF MAKING THE SAME

(75) Inventor: Ray R. Eshraghi, Cary, NC (US)

(73) Assignee: Microcell Corporation, Raleigh, NC (US)

( * ) Notice: Subject to any disclaimer, the term of this patent is extended or adjusted under 35 U.S.C. 154(b) by 923 days.

(21) Appl. No.: 10/855,927

(22) Filed: May 27, 2004

(65) Prior Publication Data

US 2004/0219421 A1 Nov. 4, 2004

Related U.S. Application Data

(63) Continuation-in-part of application No. 10/188,471, filed on Jul. 2, 2002, now Pat. No. 6,884,539.

(51) Int. Cl.
*B32B 15/02* (2006.01)
*H01M 2/16* (2006.01)
*H01M 2/18* (2006.01)

(52) U.S. Cl. .................... 429/235; 429/245; 428/600; 428/605; 428/608; 29/623.1; 228/126; 228/156

(58) Field of Classification Search .................. None
See application file for complete search history.

(56) References Cited

U.S. PATENT DOCUMENTS

| | | | |
|---|---|---|---|
| 309,439 A * | 12/1884 | Chillingworth | ............ 428/609 |
| 2,363,140 A * | 11/1944 | Persons | ................... 138/40 |
| 2,624,450 A * | 1/1953 | Britten et al. | ............... 428/602 |
| 2,753,623 A | 7/1956 | Boessenkool et al. | |
| 3,220,107 A | 11/1965 | Clark | |
| 3,408,727 A | 11/1968 | Dion | |
| 3,455,016 A | 7/1969 | Dion et al. | |

(Continued)

FOREIGN PATENT DOCUMENTS

JP 8-11598 * 1/1996

OTHER PUBLICATIONS

Gallant, R., et al., "Precious metal clad wire for use in connectors", "Nineteenth Annual Connectors and Interconnection Technology Symposium Proceedings", Oct. 1986, Publisher: Anomel Products, Inc., Published in: Shrewsbury, MA.

*Primary Examiner*—John J Zimmerman
(74) *Attorney, Agent, or Firm*—Vincent K. Gustafson; Intellectual Property/Technology Law

(57) ABSTRACT

The present invention relates to a channeled metal clad fiber comprising one or more surface channels that extend along directions that are substantially parallel to the longitudinal axis of such fiber. The present invention also provides a microfibrous fuel cell structure that comprises a hollow microfibrous membrane separator having an electrolyte medium therein and defining a bore side and a shell side. An inner current collector, which is formed of a channeled metal clad fiber or a channeled metal fiber that is unclad, and an inner electrocatalyst layer are positioned at the bore side of such microfibrous fuel cell, and an outer current collector and an outer electrocatalyst layer are positioned at the shell side of such microfibrous fuel cell. The surface channels on such inner current collector provide inner fluid passages for passing a fuel-containing or an oxidant-containing fluid through the microfibrous fuel cell.

37 Claims, 6 Drawing Sheets

U.S. PATENT DOCUMENTS

| | | |
|---|---|---|
| 3,600,790 A | 8/1971 | Dion et al. |
| 3,714,701 A | 2/1973 | Dion et al. |
| 4,101,731 A | 7/1978 | Marancik |
| 4,227,061 A | 10/1980 | Westfall et al. |
| 4,411,762 A | 10/1983 | Kline |
| 4,711,824 A * | 12/1987 | Van Hoof et al. ............ 428/607 |
| 4,776,195 A | 10/1988 | Fukuhara |
| 4,933,141 A | 6/1990 | Mankins et al. |
| 5,087,300 A * | 2/1992 | Takayama et al. .......... 29/527.2 |
| 5,279,625 A | 1/1994 | O'Neil-Bell |
| 5,296,316 A | 3/1994 | O'Neil-Bell |
| 5,483,022 A | 1/1996 | Mar |
| 5,693,203 A | 12/1997 | Ohhashi et al. |
| 5,897,963 A | 4/1999 | Seuntjens |
| 5,916,514 A | 6/1999 | Eshraghi |
| 5,925,470 A | 7/1999 | Blanyer et al. |
| 5,928,808 A | 7/1999 | Eshraghi |
| 5,989,300 A | 11/1999 | Eshraghi |
| 6,004,691 A | 12/1999 | Eshraghi |
| 6,077,364 A | 6/2000 | Chandler |
| 6,156,452 A | 12/2000 | Kozuki et al. |
| 6,258,187 B1 | 7/2001 | Chandler |
| 6,274,250 B1 * | 8/2001 | Terziani ..................... 428/579 |
| 6,338,913 B1 | 1/2002 | Eshraghi |
| 6,399,232 B1 | 6/2002 | Eshraghi |
| 6,403,248 B1 | 6/2002 | Eshraghi |
| 6,403,517 B1 | 6/2002 | Eshraghi |
| 6,444,339 B1 | 9/2002 | Eshraghi |
| 6,495,281 B1 | 12/2002 | Eshraghi |
| 6,827,747 B2 | 12/2004 | Lisi et al. |
| 6,884,539 B2 * | 4/2005 | Eshraghi ..................... 429/40 |
| 7,020,947 B2 * | 4/2006 | Bradley ..................... 29/515 |
| 2002/0146611 A1 | 10/2002 | Kawasaki |
| 2003/0178224 A1 | 9/2003 | Goto |
| 2004/0005498 A1 | 1/2004 | Eshraghi |
| 2004/0058224 A1 | 3/2004 | Eshraghi |
| 2004/0142101 A1 | 7/2004 | Eshraghi |

* cited by examiner

US 7,473,490 B2

FUEL CELL STRUCTURES AND ASSEMBLIES WITH CHANNELED CURRENT COLLECTORS, AND METHOD OF MAKING THE SAME

CROSS-REFERENCE TO RELATED APPLICATIONS

This is a continuation-in-part of U.S. patent application Ser. No. 10/188,471 filed Jul. 2, 2002, and subsequently issued as U.S. Pat. No. 6,884,539 on Apr. 26, 2005 in the name of Ray E. Eshraghi for "MICROCELL ELECTROCHEMICAL DEVICES AND ASSEMBLIES WITH CORROSION-RESISTANT CURRENT COLLECTORS, AND METHOD OF MAKING THE SAME."

BACKGROUND OF THE INVENTION

1. Field of the Invention

This invention relates in general to fuel cell structures and assemblies, and method of making the same.

2. Description of the Art

U.S. Pat. Nos. 5,916,514; 5,928,808; 5,989,300; 6,004,691; 6,338,913; 6,399,232; 6,403,248; 6,403,517; 6,444,339; and 6,495,281 describe microfibrous electrochemical cell structures that each contain an inner current collector, an inner electrocatalyst layer, a hollow fibrous membrane separator with electrolyte medium therein, an outer electrocatalyst layer, and an outer current collector. Specifically, both the inner and outer current collects are made of metal fibers and are disposed respectively on the inner and the outer surface of the hollow fibrous membrane separator.

Since such metal-fiber-formed current collectors are directly exposed to the harsh electrochemical environment near the membrane separator surfaces, they are especially susceptible to corrosion. Corrosion of the current collectors can result in ionic contamination of the polymer membrane electrolyte and reduction in ionic conductivity of the cell for transport of protons. In severe cases, electrical disconnection may occur within individual cells or between adjacent cells that connected together in series or in parallel, which disconnection shortens the useful life of such microfibrous electrochemical cells and reduces the power density of electrochemical assemblies comprising same.

It is accordingly an object of the present invention to provide corrosion-resistant current collectors for prolonging the useful life and enhancing the reliability of such microfibrous electrochemical cells or assemblies comprising same.

Further, for fuel cell applications, the hollow fibrous membrane separator must further provide an inner fluid passage at its bore side, for passing a fuel- or oxidant-containing fluid therethrough. Such inner fluid passage can be easily blocked upon deformation of the hollow fibrous membrane separator, which will in turn reduce the power output of the electrochemical cells. The need for providing and maintaining such inner fluid passage increases the manufacturing costs of the microfibrous fuel cells.

It is therefore another object of the present invention to provide microfibrous fuel cells with inner fluid passage(s) that is easy to produce and blockage-resistant.

Furthermore, for fuel cell applications, the electrical contact generated between the surface of the catalyst and the current collector plays a significant role in the performance of the fuel cell. In general the higher the contact surface area, the lower the contact resistance in the cell, which translates into higher and more efficient power generation.

It is therefore another object of this invention to provide a microfibrous fuel cell with excellent contact between the catalyst layer and the current collector at the bore side of the cell.

Other objects of the present invention will be more fully apparent from the ensuing disclosure and appended claims.

SUMMARY OF THE INVENTION

The present invention in one aspect relates to a fibrous article having a longitudinal axis. Such fibrous article comprises two or more metal layers bonded together by solid-phase bonding, and one or more surface channels extending along directions that are substantially parallel to its longitudinal axis.

Another aspect of the present invention relates to a method for producing a metal clad fiber with surface channels as described hereinabove, by the steps of:

forming a precursor structure that has a longitudinal axis and comprises a metal core and one or more metal protective layers formed over the metal core, with at least one removable metal component partially embedded in at least one of such metal protective layers and partially exposed on a surface of the precursor structure, wherein such one or more metal protective layers are bonded to the metal core as well as to one another by solid-phase bonding, and wherein the removable metal component extends along the longitudinal axis of such precursor structure; and drawing the precursor structure into a fibrous structure; and selectively removing the removable metal component from the fibrous structure, in such manner that the metal core and the one or more protective metal layers form a metal clad fiber that has one or more surface channels extending along directions that are substantially parallel to the longitudinal axis of such metal clad fiber.

Still another aspect of the present invention relates to a microfibrous fuel cell comprising:

a hollow microfibrous membrane separator containing an electrolyte medium and defining a bore side and a shell side;

an inner current collector and an inner electrocatalyst structure at the bore side of such hollow microfibrous membrane separator; and an outer current collector and an outer electrocatalyst structure at the shell side of such hollow microfibrous membrane separator, wherein the inner current collector comprises a metal clad fiber having a longitudinal axis, and wherein such metal clad fiber comprises two or more metal layers bonded together by solid-phase bonding and one or more surface channels extending along directions that are substantially parallel to its longitudinal axis.

Yet another aspect of the present invention relates to a microfibrous fuel cell comprising:

a hollow microfibrous membrane separator containing an electrolyte medium and defining a bore side and a shell side;

an inner current collector and an inner electrocatalyst structure at the bore side of such hollow microfibrous membrane separator; and an outer current collector and an outer electrocatalyst structure at the shell side of such hollow microfibrous membrane separator, wherein the inner current collector comprises a metal fiber having a longitudinal axis and one or more surface channels extending along directions that are substantially parallel to its longitudinal axis.

A further aspect of the present invention relates to a method for producing a metal fiber with surface channels as described hereinabove, by the steps of:

forming a precursor structure that has a longitudinal axis and comprises at least one supporting metal component and at least one removable metal component that is partially embedded in such supporting metal component and partially exposed to a surface of the precursor structure, wherein such removable metal component extends along the longitudinal axis of the precursor structure; and drawing the precursor structure into a fibrous structure; and selectively removing the removable metal component from the fibrous structure, in such manner that the supporting metal component forms a metal fiber having one or more surface channels extending along directions that are substantially parallel to the longitudinal axis of the metal fiber.

The terms "microfibrous," "fibrous," and "fiber" are used interchangeably herein to refer to fibrous structures having a cross-sectional outer diameter in a range of from about 10 microns to about 10 millimeters, preferably from about 10 microns to about 5 millimeters, and more preferably from about 100 microns to about 1 millimeter.

Other aspects, features and advantages of the invention will be more fully apparent from the ensuing disclosure and appended claims.

DETAILED DESCRIPTION OF THE INVENTION, AND PREFERRED EMBODIMENTS THEREOF

Figure 1A:
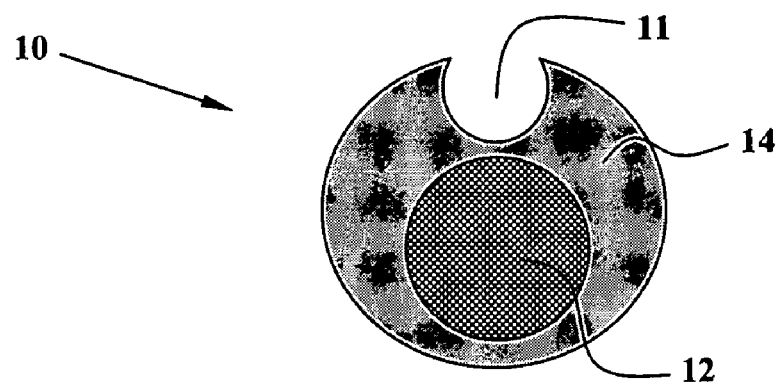
FIG. 1A is a cross-sectional view of a double-layer metal clad fiber having one surface channel, according to one embodiment of the present invention.

Disclosures of the following U.S. patents and patent application publications are incorporated herein by reference, in their respective entireties and for all purposes:

U.S. Pat. No. 5,916,514 issued on Jun. 29, 1999 for "PROCESS OF FABRICATING FIBROUS ELECTROCHEMICAL CELLS;"

U.S. Pat. No. 5,928,808 issued on Jul. 27, 1999 for "FIBROUS ELECTROCHEMICAL FEED CELLS;"

U.S. Pat. No. 5,989,300 issued on Nov. 23, 1999 for "PROCESS OF PRODUCING ELECTROCHEMICAL PRODUCTS OR ENERGY FROM A FIBEROUS ELECTROCHEMICAL CELL;"

U.S. Pat. No. 6,004,691 issued on Dec. 21, 1999 for "FIBROUS BATTERY CELLS;"

U.S. Pat. No. 6,338,913 issued on Jul. 15, 2002 for "DOUBLE-MEMBRANE MICROCELL ELECTROCHEMICAL DEVICES AND ASSEMBLIES, AND METHOD OF MAKING AND USING THE SAME;"

U.S. Pat. No. 6,399,232 issued on Jun. 4, 2002 for "SERIES-CONNECTED MICROCELL ELECTROCHEMICAL DEVICES AND ASSEMBLIES, AND METHOD OF MAKING AND USING THE SAME;"

U.S. Pat. No. 6,403,248 issued on Jun. 11, 2002 for "MICROCELL ELECTROCHEMICAL DEVICES ASSEMBLIES WITH WATER MANAGEMENT SUBSYSTEM, AND METHOD OF MAKING AND USING THE SAME;"

U.S. Pat. No. 6,403,517 issued on Jun. 11, 2002 for "SYSTEM AND PROCESS FOR MANUFACTURING MICROCELL ELECTROCHEMICAL DEVICES AND ASSEMBLIES;"

U.S. Pat. No. 6,444,339 issued on Sep. 3, 2002 for "MICROCELL ELECTROCHEMICAL DEVICE ASSEMBLIES WITH THERMAL MANAGEMENT SUBSYSTEM, AND METHOD OF MAKING AND USING THE SAME;"

U.S. Pat. No. 6,495,281 issued on Dec. 17, 2002 for "MICROCELL ELECTROCHEMICAL DEVICES ASSEMBLIES WITH CORROSION MANAGEMENT SUBSYSTEM, AND METHOD OF MAKING AND USING THE SAME;"

U.S. Pat. No. 6,884,539 issued on Apr. 26, 2005 for "MICROCELL ELECTROCHEMICAL DEVICES AND ASSEMBLIES WITH CORROSION-RESISTANT CURRENT COLLECTORS, AND METHOD OF MAKING THE SAME;"

U.S. Patent Application Publication No. 2004/0058224 published on Mar. 25, 2004 for "MICROCELL FUEL CELLS, FUEL CELL ASSEMBLIES, AND METHODS OF MAKING THE SAME;"

U.S. Pat. No. 7,354,545 issued on Apr. 8, 2008 for "SUBSTRATE-SUPPORTED PROCESS FOR MANUFACTURING MICROFIBROUS FUEL CELLS;"

U.S. Patent Application Publication No. 2004/0197557 published on Oct. 7, 2004 for "PROCESS FOR MANUFACTURING HOLLOW FIBERS;"

U.S. Patent Application Publication No. 2004/0191588 published on Sep. 30, 2004 for "HYDROGEN STORAGE SYSTEMS AND FUEL CELL SYSTEMS WITH HDYROGEN STORAGE CAPACITY;" and U.S. Pat. No. 7,229,712 issued on Jun. 12, 2007 for "FUEL CELL STRUCTURES AND ASSEMBLIES."

The present invention provides a metal clad fiber having one or more surface channels that extend along directions that are substantially parallel to the longitudinal axis of such metal fiber, for forming the inner current collector of a microfibrous fuel cell.

Specifically, such metal clad fiber comprises two or more metal layers, including at least a metal core and one or more metal protective layers formed over such metal core. Such metal protective layers contain metal or metal alloy that is different from that contained in the metal core, and they are bonded to the metal core as well as to one another at the respective interfaces by solid-phase bonding, which is described in greater detail hereinafter.

The surface channels of such metal clad fiber are formed of longitudinally-extending surface cavities that are partially embedded in at least one of the metal protective layers. Such surface channels are separated from the metal core of the metal clad fiber, while being partially exposed to a surface of such fiber, so that a fluid being passed through such surface channels is isolated from the metal core, but not from the fiber surface.

FIG. 1A shows a cross-section view of an exemplary metal clad fiber 10, according to one embodiment of the present invention.

The clad fiber 10 specifically comprises a metal core 12 and a metal protective layer 14 encapsulating such metal core. A single surface channel 11 is partially embedded in the metal protective layer 14 and partially exposed to a surface of the clad fiber 10. Further, the metal core 12 is isolated from such surface channel 11. With such configuration, a fluid passing through such surface channel 11 contacts the surface of the clad fiber 10 without contacting the metal core.

Figure 1B:
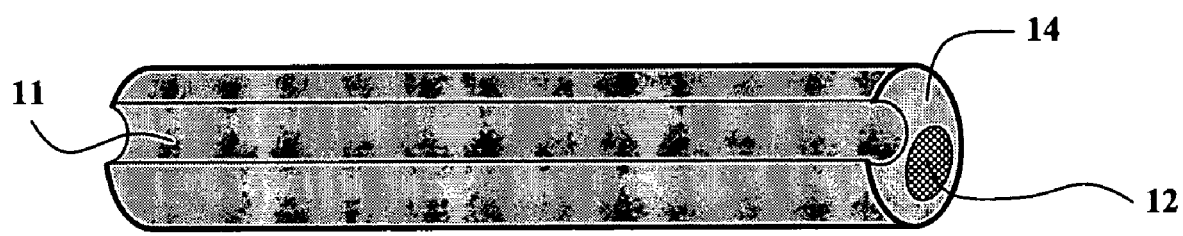
FIG. 1B is a perspective view of the metal clad fiber of FIG. 1A.

FIG. 1B shows a perspective view of the metal clad fiber 10, with the surface channel 11 extending along a direction that is parallel to the longitudinal axis 13 of the metal clad fiber 10. A fluid can therefore be passed from one terminal end of the fiber 10 to the other through such longitudinally-extending surface channel 11.

The metal core of the metal clad fiber is preferably formed of metal or metal alloy characterized by low electrical resistance (e.g., resistance less than 10 $\mu\Omega$·cm, preferably less than 5 $\mu\Omega$·cm), high mechanical strength, good formability, and low manufacturing cost. Suitable metals or metal alloys for forming the metal core include, but are not limited to: copper, aluminum, brass, bronze, nickel, silver, and alloys thereof.

The one or more metal protective layers are preferably formed of metal or metal alloy characterized by high corrosion-resistance, high mechanical strength, and good formability. Suitable metals or metal alloys for forming the metal protective layers include, but are not limited to: titanium, niobium, nickel, zirconium, gold, tantalum, platinum, palladium, silver, and alloys thereof.

The above lists of metals and metal alloys are only exemplary and are not intended to limit the broad scope of the present invention.

The metal core 12 and the metal outer layer 14 are preferably bonded together at their interfacial surface by solid-phase bonding, which is the bonding of two different metals or metal alloys without the formation of any liquid phase material at their interfaces.

The solid-phase bonding of two different metals is achieved by a hot co-extrusion process that is well known in the art, in which two metals are pressed together at an elevated temperature, to cause deformation of such metals in form of reduction in cross-sectional area of the metals. The elevated temperature is within a range of from just above the minimum re-crystallization temperature of the metal that has the lower re-crystallization temperature to the highest temperature at which both metals may be deformed without any pulling apart or any formation of brittle compounds or liquid phase material at the interface of the metals being bonded. By applying pressure at such elevated temperature, it is possible to solid-phase bond layers of any two or more metals or metal alloys to form a multiple-layer metal clad composite.

The strength of the solid-phase bonding is a function of the elevated temperature and the amount of deformation that such metals undergo. Preferably, the elevated temperature is within a range of from about 400° C. to about 900° C., and the amount of deformation that such metals undergo is expressed as a reduction in cross-sectional area ratios of such metals, e.g., in a range of from about 7:1 (i.e., the cross-sectional area reduces from 7 to 1 due to such deformation) to about 64:1 (i.e., the cross-sectional area reduces from 64 to 1 due to such deformation).

The solid-phase bonding formed according to the above-described method can be further strengthened by a subsequent sintering step. The thermal energy provided by such sintering step increases atomic mobility of the metals and effects growth of the bond areas at the bonding interface between the metals. As a result, the solid-phase bonding between such metals is further strengthened.

Figure 2A:
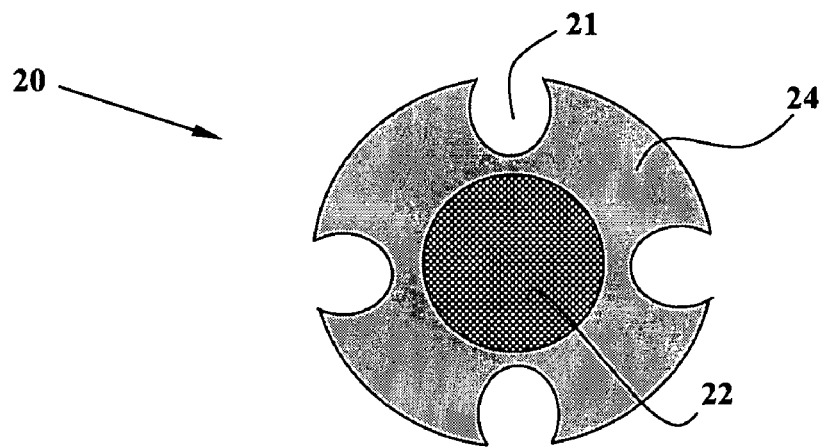
FIG. 2A is a cross-sectional view of a double-layer metal clad fiber having four surface channels, according to one embodiment of the present invention.
Figure 2B:
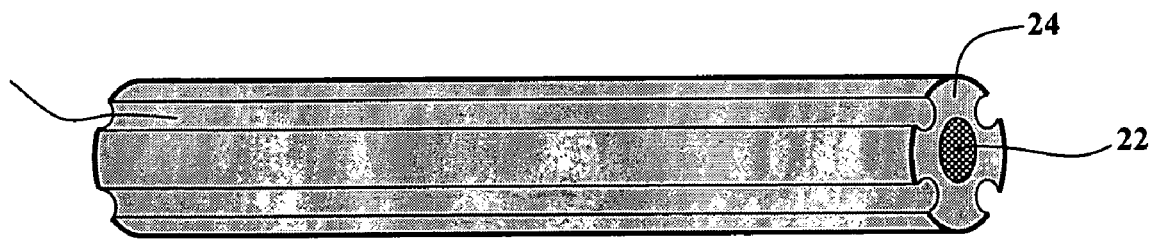
FIG. 2B is a perspective view of the metal clad fiber of FIG. 2A.
Figure 3:
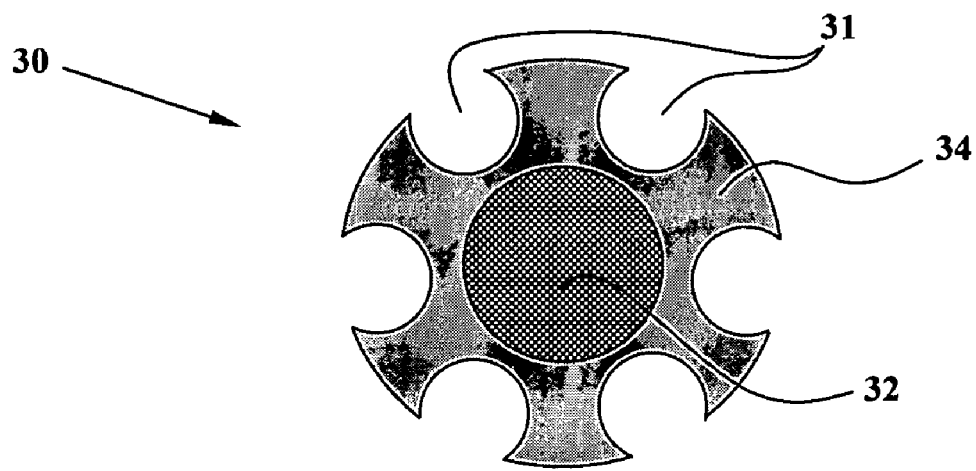
FIG. 3 is a cross-sectional view of a double-layer metal clad fiber having six surface channels, according to one embodiment of the present invention.
Figure 4:
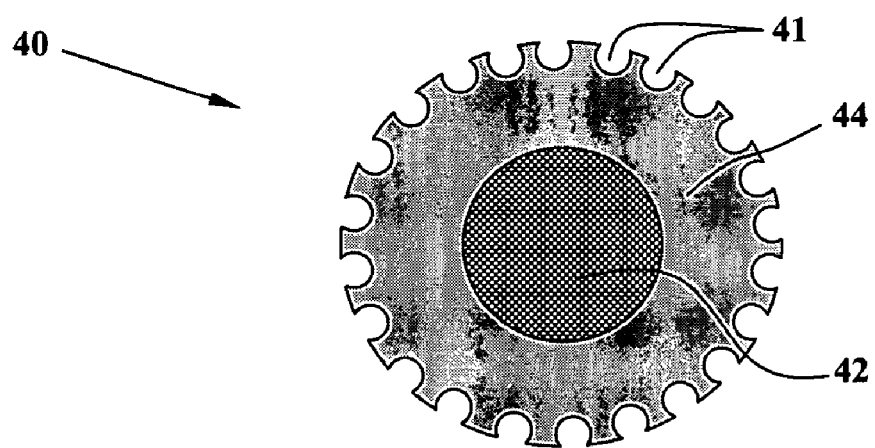
FIG. 4 is a cross-sectional view of a double-layer metal clad fiber having multiple surface channels, according to one embodiment of the present invention.

The metal clad fiber of the present invention may comprise any number of surface channels without limitation. For example, FIGS. 2A and 2B shows an exemplary metal clad fiber 20 having four longitudinally-extending surface channels 21. FIG. 3 shows another metal clad fiber 30 having six longitudinally-extending surface channels 31, and FIG. 4 shows still another metal clad fiber 40 having more than twenty surface channels 41.

Such surface channels can have any cross-sectional shape or configuration, either regular or irregular, including but not limited to circular, semi-circular, oval, crescent, cross, triangle, square, rectangular, parallelogram, trapezoidal, polyhedron, star-like, etc. FIGS. 1-4 only provide illustrative examples and should be construed to limit the broad scope of the present invention.

Figure 5:
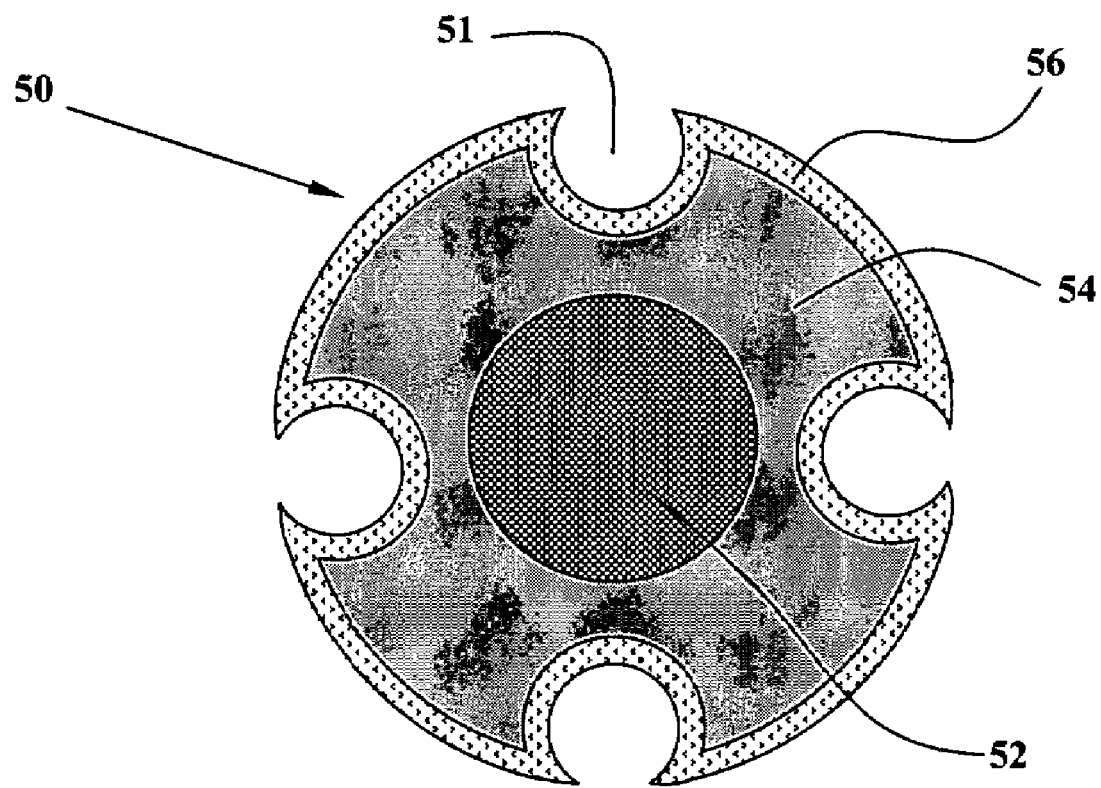
FIG. 5 is a cross-sectional view of a three-layer metal clad fiber having four surface channels, according to one embodiment of the present invention.

The metal clad fiber of the present invention may comprise more than two metal layers, as shown in FIG. 5. Specifically, the metal clad fiber 50 comprises a metal core 52 formed of a first metal or metal alloy, a first metal protective layer 54 formed of a second metal or metal alloy and encapsulating the metal core 52, and a second metal protective layer 56 formed of a third metal or metal alloy and encapsulating the first metal protective layer 54, wherein the metal core 52 and the first and second metal protective layers 54 and 56 are bonded to one another at their respective interfaces by solid-phase bonding.

Four longitudinally-extending surface channels 52 are partially embedded in the metal protective layers 56 and 54, with openings to the surface of the clad fiber 50.

The metal core 52 is preferably formed of metal or metal alloy having low electrical resistance (i.e., resistance less than 10 $\mu\Omega$·cm, preferably less than 5 $\mu\Omega$·cm), high mechanical strength, good formability, and low manufacturing cost, such as copper, aluminum, brass, bronze, nickel, silver, etc., and alloys thereof. More preferably, the metal core 52 is formed of a metal selected from the group consisting of copper and aluminum, and alloys thereof, and most preferably, the metal core 52 is formed of copper or copper-containing metal alloy.

The first metal protective layer 54 and the second metal protective layer 56 are preferably formed of metal or metal alloy having high corrosion-resistance, high mechanical strength, and good formability, such as titanium, niobium, nickel, zirconium, gold, tantalum, platinum, palladium, silver, etc., and alloys thereof. More preferably, the metal or metal alloy for forming the first metal protective layer 54 is selected from the group consisting of titanium, niobium, nickel, and alloys including the same, and the metal or metal alloy for forming the second metal protective layer 56 is selected from the group consisting of niobium, platinum, tantalum, gold, zirconium, and alloys including the same. Most preferably, the first metal protective layer 54 is formed of titanium or titanium-containing alloy, and the second metal protective layer 56 is formed of niobium, tantalum, or niobium-and/or tantalum-containing alloy.

As mentioned hereinabove, the specific metals and metal alloys identified herein are only exemplary and are not intended to limit the broad scope of the present invention.

The following is a list of preferred compositions of two- or three-layer metal clad fibers useful for practice of the present invention:

| No. | Metal Core | First Metal Protective Layer (Inner) | Second Metal Protective Layer (Outer) |
| --- | --- | --- | --- |
| 1 | Copper | — | Titanium |
| 2 | Copper | — | Nickel |
| 3 | Copper | Titanium | Platinum |
| 4 | Copper | Titanium | Gold |
| 5 | Copper | Titanium | Tantalum |
| 6 | Copper | Titanium | Niobium |
| 7 | Copper | Titanium | Zirconium |
| 8 | Copper | Niobium | Platinum |
| 9 | Copper | Nickel | Platinum |
| 10 | Copper | Nickel | Gold |

Figure 6:
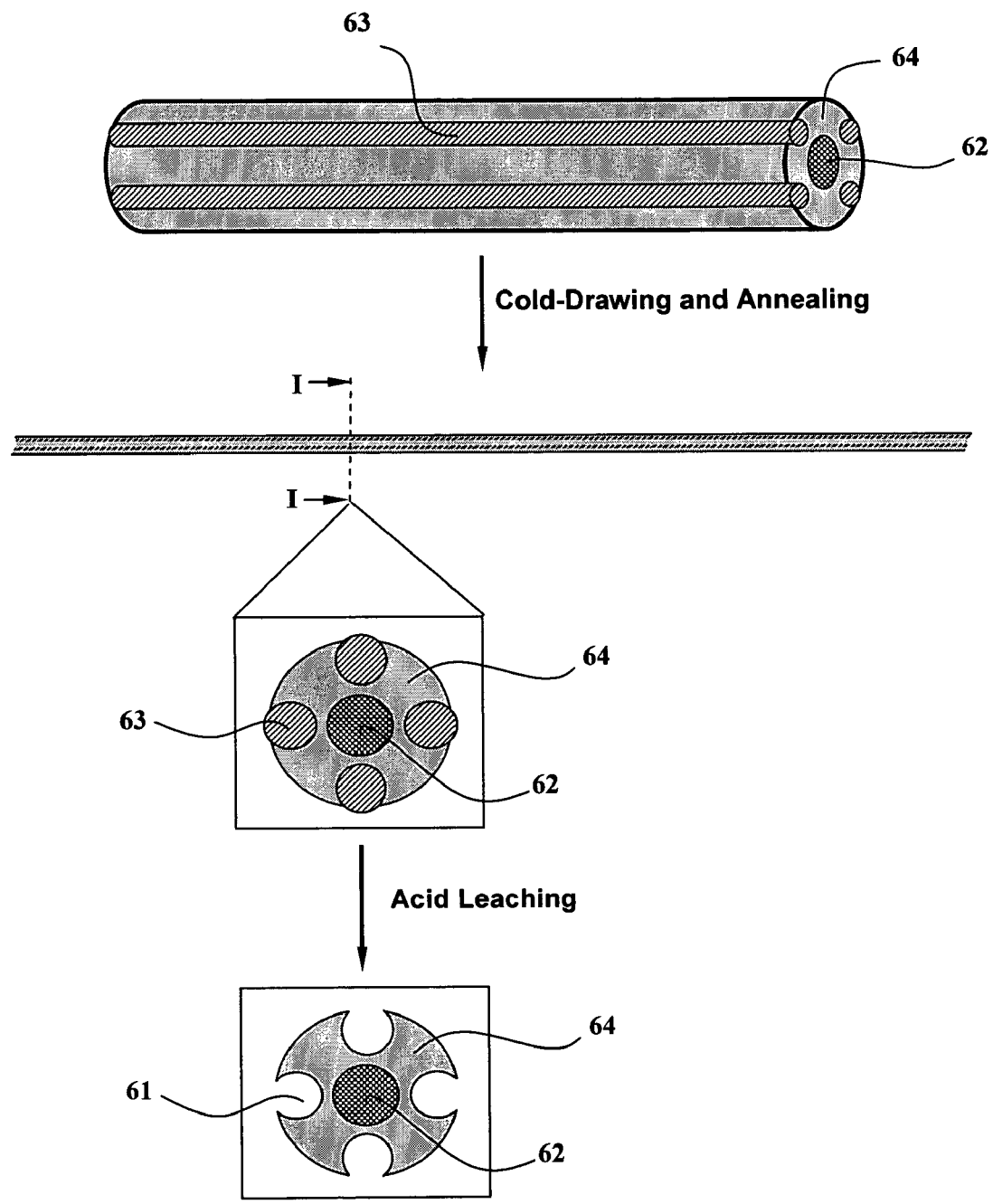
FIG. 6 illustrates a process for forming the channeled metal clad fibers, according to one embodiment of the present invention.

The above-described channeled metal clad fibers can be formed by a process illustrated in FIG. 6:

(1) forming a composite metal billet 60A (i.e., a precursor structure) having a longitudinal axis and comprising a metal core 62 and one or more metal protective layers 64 encapsulating such metal core, with one or more removable metal components 63 partially embedded in at least one of such metal protective layers 64 and partially exposed on a surface of such metal billet 60A. Such removable metal components 63 extend along the longitudinal axis of such metal billet 60A. Such composite metal billet 60A are preferably formed by the well-known hot co-extrusion techniques as described hereinabove, so that the one or more metal protective layers 64 are bonded to the metal core 62 as well as to one another by solid-phase bonding;

(2) drawing the metal billet 60A into a thin metal wire or a metal fiber 60B, via a series of cold drawing and annealing steps, wherein the metal fiber 60B so formed comprises the metal core 62, the one or more metal protective layers 64, and the one or more removable metal components 63 (see the enlarged cross-sectional view of the metal fiber 60B); and (3) selectively removing the removable metal components from the metal fiber 60B, via acid-leaching or other material-removal techniques, in such manner that the metal core 62 and the one or more metal protective layers 64 remain intact and form a metal fiber 60C having one more longitudinally-extending surface channels 61 (see the enlarged cross-sectional view of the channeled metal fiber 60C).

The removable metal components 63 may comprise any metal or metal alloy that can be selectively removed without impairing the structural integrity of the metal core and the metal protective layers. Such removable metal components preferably comprise metal or metal alloy with sufficient formability, good removability, and low manufacturing cost, such as copper, aluminum, brass, bronze, nickel, silver, etc., and alloys thereof. More preferably, the removable metal components 63 are formed of a metal selected from the group consisting of copper and aluminum, and alloys thereof, and most preferably, the removable metal components 63 are formed of copper or copper-containing metal alloy.

Because the metal core 62 are encapsulated by the metal protective layers 64 and is not exposed to the surface of the metal fiber 60B (see FIG. 6), such metal core 62 may comprise the same metal or metal alloy as that of the removable metal components 63, and such metal core 62 will remain intact during the removal step when the removable metal components 63 (which are partially exposed on the surface of the metal fiber 60B) is selectively removed.

The selective removal of the removable metal components 63 may be carried out by any suitable techniques, which include but are not limited to acid-leaching techniques.

The above-described channeled metal clad fibers can be advantageously used for forming inner current collectors in microfibrous fuel cell structures described in U.S. Pat. Nos. 5,916,514; 5,928,808; 5,989,300; 6,004,691; 6,338,913; 6,399,232; 6,403,248; 6,403,517; 6,444,339; 6,495,281; 6,884,539; 7,354,545; and 7,229,712; and U.S. Patent Application Publication Nos. 2004/0058224; 2004/0197557; and 2004/0191588. The surface channels of such metal clad fibers can function as the inner fluid passages that are required for such microfibrous fuel cells.

Figure 7:
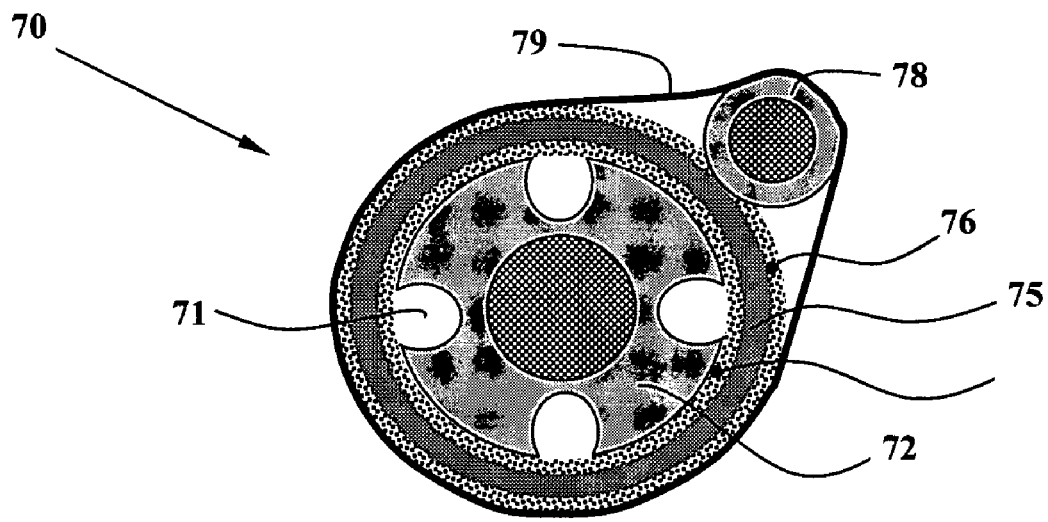
FIG. 7 is a cross-sectional view of a microfibrous fuel cell comprising an inner current collector formed of a channeled metal clad fiber, according to another embodiment of the present invention.

FIG. 7 shows a cross-sectional view of an exemplary microfibrous fuel cell 70, which comprises a hollow microfibrous membrane separator 75 that contains an electrolyte medium therein and defines a bore side and a shell side. At the bore side of such membrane separator 75 are placed an inner current collector 72 and an inner electrocatalyst layer 74, and at the shell side of such membrane separator 75 are placed an outer current collector 78 and an outer electrocatalyst layer 76. A wrapping element 79 winds around such microfibrous fuel cell 70 and wraps it into a compact and unitary cell.

The inner current collector 72 is formed of a double-layer metal clad fiber having four surface channels 71, as described hereinabove. A fuel- or oxidant-containing fluid can be passed through such surface channels 71 of the inner current collector 72 to feed the electrochemical reaction at the interface between the membrane separator 75 and the inner electrocatalyst layer 74.

Such configuration not only obviates the need for providing a separate inner fluid passage, but also significantly increases the contacting surface area between the inner current collector 72 and the inner electrocatalyst layer 74, thereby increasing the performance of the fuel cell and reducing the risk of electrical disconnection.

Further, since the inner fluid passages 71 are partially embedded in the inner current collector 72 and structurally supported thereby, the risk of blockage of such passages due to deformation of the membrane separator 75 is significantly reduced. Therefore, the microfibrous fuel cell 70 can be tightly wrapped by the wrapping element 79 to reduce the contact resistance between the outer current collector 78 and the outer electrocatalyst layer 76 and to achieve higher and more efficient power generation, without deforming the inner fluid passages 71.

For microfibrous fuel cell applications, the above-described channeled metal clad fibers preferably have an outer diameter within a range of from about 100 µm to about 10 mm, more preferably from about 100 µm to about 1000 µm, and most preferably from about 200 µm to about 500 µm.

If the channeled metal clad fiber comprises a double-layer structure as described hereinabove, the metal core may have an outer diameter within a range of from about 10 μm to about 10 mm, more preferably from about 100 μm to about 1000 μm, and most preferably from about 150 μm to about 500 μm.

If the channeled metal clad fiber comprises a three-layer structure as described hereinabove, the first metal protective layer may have an outer diameter within a range of from about 100 μm to about 10 mm, more preferably from about 100 μm to about 1000 μm, and most preferably from about 200 μm to about 500 μm, while the metal core may have an outer diameter within a range of from about 10 μm to about 10 mm, more preferably from about 100 μm to about 1000 μm, and most preferably from about 150 μm to about 500 μm.

However, the microcell current collectors of the present invention are not limited to the two-layer or three-layer structures. A person ordinarily skilled in the art can readily design channeled metal clad fibers having additional layers of metal or non-metal conductive materials, such as conductive polymers, carbonaceous materials, or conductive ceramics, etc., for the purpose of further enhancing the corrosion resistance and mechanical strength of such channeled metal clad fibers for forming microcell current collectors useful for practicing the present invention. Moreover, the metal core of such channeled metal clad fiber is not limited to the solid form as described hereinabove. In a preferred embodiment of the present invention, such metal core may be a hollow, tubular metal element, through which heat-exchanging fluid (such as air or heat-exchanging liquids) can be passed. In such configuration, the inner current collectors concurrently function as heat-exchanging tubes, for conducting heat generated by the electrochemical reaction out of the microcell system.

Figure 8:
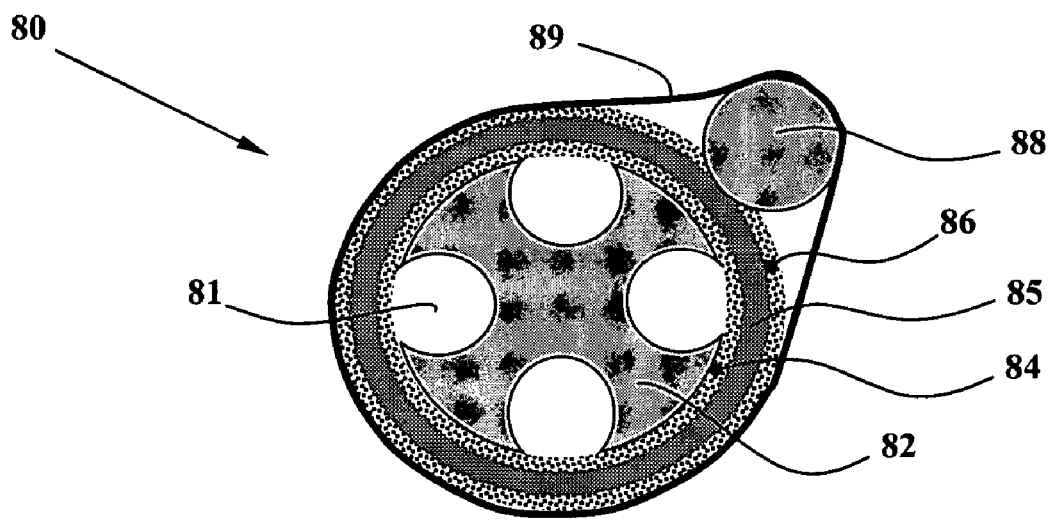
FIG. 8 is a cross-sectional view of a microfibrous fuel cell comprising an inner current collector formed of a channeled metal fiber, according to another embodiment of the present invention.

In an alternative embodiment, the present invention provides a microfibrous fuel cell structure comprising an inner current collector formed of a channeled metal fiber having a single, un-clad metal layer, as shown in FIG. 8.

Specifically, the microfibrous fuel cell 80 comprises a hollow microfibrous membrane separator 85 that contains an electrolyte medium therein and defines a bore side and a shell side. At the bore side of such membrane separator 85 are placed an inner current collector 82 and an inner electrocatalyst layer 84, and at the shell side of such membrane separator 85 are placed an outer current collector 88 and an outer electrocatalyst layer 86. A wrapping element 89 winds around such microfibrous fuel cell 80 and wraps it into a compact and unitary cell.

The inner current collector 82 is formed of a single-layer, unclad metal fiber, which has four surface channels 81. A fuel- or oxidant-containing fluid can be passed through such surface channels 81 of the inner current collector 82 to feed the electrochemical reaction at the interface between the membrane separator 85 and the inner electrocatalyst layer 84.

Such unclad, channeled metal fiber of FIG. 8 functions in a manner similar to the double-layer metal clad fiber of FIG. 7, and is therefore included in the broad scope of the present invention.

The process described hereinabove for forming the channeled metal clad fibers can be applied for forming channeled metal fibers that are unclad.

Specifically, a composite metal billet (i.e., a precursor structure) can be formed by hot co-extrusion, which has a longitudinal axis and comprises a supporting metal component with one or more removable metal components partially embedded in such supporting metal component and partially exposed on a surface of such metal billet, while such removable metal components extend along directions that are parallel to the longitudinal axis of such metal billet. Such composite metal billet can be drawn into a metal fiber via a series of cold drawing and annealing steps, wherein such metal fiber comprises the supporting metal component and the one or more removable metal components, in correspondence with those of the composite metal billet. Subsequently, the removable metal components are selectively removed from such metal fiber, via acid-leaching or other material-removal techniques, in such manner that the supporting metal component remains intact and forms a metal fiber having one or more longitudinally-extending surface channels.

While the invention has been described herein with reference to specific embodiments, features and aspects, it will be recognized that the invention is not thus limited, but rather extends in utility to other modifications, variations, applications, and embodiments, and accordingly all such other modifications, variations, applications, and embodiments are to be regarded as being within the spirit and scope of the invention.

What is claimed is:

1. A fibrous article having a longitudinal axis and comprising a metal core, a first metal protective layer, and a second metal protective layer bonded together along respective interfaces by solid-phase bonding, with one or more surface channels extending along directions that are substantially parallel to the longitudinal axis, wherein:
   the first metal protective layer is formed over the metal core;
   the second protective layer is formed over the first protective layer;
   the first metal protective layer and the second metal protective layer comprise at least one different metal or metal alloy; and
   the metal core comprises material selected from the group consisting of copper, aluminum, brass, bronze, nickel, silver, and alloys including the same.

2. The fibrous article of claim 1, characterized by a cross-sectional outer diameter in a range of from about 10 microns to about 5 millimeters.

3. The fibrous article of claim 1, characterized by a cross-sectional outer diameter in a range of from about 100 microns to about 1 millimeter.

4. The fibrous article of claim 1, wherein the one or more surface channels consists of a single surface channel.

5. The fibrous article of claim 1, wherein the one or more surface channels includes multiple surface channels.

6. The fibrous article of claim 1, wherein the one or more surface channels are partially embedded in said at least one metal protective layer.

7. The fibrous article of claim 1, wherein the one or more surface channels are isolated from the metal core.

8. The fibrous article of claim 1, wherein any of the first and the second metal protective layer comprises material selected from the group consisting of titanium, niobium, nickel, zirconium, gold, tantalum, platinum, palladium, silver, and alloys including the same.

9. The fibrous article of claim 1, wherein the one or more surface channels are characterized by a cross-sectional shape selected from the group consisting of circular, semi-circular, oval, crescent, cross, triangle, square, rectangular, parallelogram, trapezoidal, polyhedron, and star-shaped.

10. The fibrous article of claim 1, wherein the metal core contains copper, and any of the first and the second metal protective layer contains titanium.

11. The fibrous article of claim 1, wherein the metal core contains copper, and any of the first and the second metal protective layer contains nickel.

12. The fibrous article of claim 1, wherein the metal core comprises copper.

13. The fibrous article of claim 1, wherein the first metal protective layer comprises material selected from the group consisting of titanium, niobium, nickel, and alloys including the same.

14. The fibrous article of claim 1, wherein the second metal protective layer comprises material selected from the group consisting of niobium, platinum, tantalum, gold, zirconium, and alloys including the same.

15. The fibrous article of claim 1, wherein the first metal protective layer comprises titanium or titanium-containing alloy, and wherein the second metal protective layer comprises any of niobium, tantalum, niobium-containing alloy, and and/or tantalum-containing alloy.

16. The fibrous article of claim 1, wherein the metal core comprises copper, wherein the first metal protective layer comprises titanium, and wherein the second metal protective layer comprises platinum.

17. The fibrous article of claim 1, wherein the metal core comprises copper, wherein the first metal protective layer comprises titanium, and wherein the second metal protective layer comprises gold.

18. The fibrous article of claim 1, wherein the metal core comprises copper, wherein the first metal protective layer comprises titanium, and wherein the second metal protective layer comprises tantalum.

19. The fibrous article of claim 1, wherein the metal core comprises copper, wherein the first metal protective layer comprises titanium, and wherein the second metal protective layer comprises niobium.

20. The fibrous article of claim 1, wherein the metal core comprises copper, wherein the first metal protective layer comprises titanium, and wherein the second metal protective layer comprises zirconium.

21. The fibrous article of claim 1, wherein the metal core comprises copper, wherein the first metal protective layer comprises niobium, and wherein the second metal protective layer comprises platinum.

22. The fibrous article of claim 1, wherein the metal core comprises copper, wherein the first metal protective layer comprises nickel, and wherein the second metal protective layer comprises platinum.

23. The fibrous article of claim 1, wherein the metal core comprises copper, wherein the first metal protective layer comprises nickel, and wherein the second metal protective layer comprises gold.

24. A method for producing a metal clad fiber having (i) a metal core comprising material selected from the group consisting of copper, aluminum, brass, bronze, nickel, silver, and alloys including the same, (ii) a first metal protective layer, and (iii) a second metal protective layer comprising at least one different metal or metal alloy from the first metal protective layer, the method including the steps of:
    forming a precursor structure having a longitudinal axis, said metal core, said first metal protective layer formed over the metal core, and said second metal protective layer formed over the first metal protective layer, with at least one removable metal component partially embedded in at least one of said first and second metal protective layer and partially exposed on a surface of said precursor structure, wherein said metal core, said first metal protective layer, and said second metal protective layer are bonded together along respective interfaces by solid-phase bonding, and wherein said removable metal component extends along the longitudinal axis; and
    drawing the precursor structure into a fibrous structure; and selectively removing the removable metal component from said fibrous structure, in such manner that the metal core and the one or more protective metal layers form a metal clad fiber that has one or more surface channels extending along directions that are substantially parallel to the longitudinal axis of the metal clad fiber.

25. The method of claim 24, wherein said at least one removable metal component comprises material selected from the group consisting of copper, aluminum, brass, bronze, nickel, silver, and alloys including the same.

26. The method of claim 24, wherein said at least one removable metal component comprises material selected from the group consisting of copper, aluminum, and alloys including the same.

27. The method of claim 24, wherein said at least one removable metal component is selectively removed by acid-leaching.

28. A microfibrous fuel cell, comprising:
    a hollow microfibrous membrane separator containing an electrolyte medium and defining a bore side and a shell side;
    an inner current collector and an inner electrocatalyst structure at the bore side of said hollow microfibrous membrane separator; and
    an outer current collector and an outer electrocatalyst structure at the shell side of said hollow microfibrous membrane separator,
wherein the inner current collector comprises the fibrous article of claim 1.

29. The microfibrous fuel cell of claim 28, wherein said metal core has a cross-sectional outer diameter within a range of from about 10 μm to about 10 mm.

30. A fibrous article having a longitudinal axis and comprising (i) a metal core containing copper and (ii) at least one metal protective layer bonded together by solid-phase bonding, with one or more surface channels extending along directions that are substantially parallel to the longitudinal axis, wherein the at least one metal protective layer contains any of titanium and nickel.

31. The fibrous article of claim 30, characterized by a cross-sectional outer diameter in a range of from about 10 microns to about 5 millimeters.

32. The fibrous article of claim 30, wherein the one or more surface channels includes multiple surface channels.

33. The fibrous article of claim 30, wherein the one or more surface channels are isolated from the metal core.

34. The fibrous article of claim 30, wherein the at least one metal protective layer includes a first metal protective layer disposed over the metal core and a second metal protective layer disposed over the first metal protective layer, and wherein the first metal protective layer and the second protective layer comprise at least one different metal or metal alloy.

35. A microfibrous fuel cell, comprising:
    a hollow microfibrous membrane separator containing an electrolyte medium and defining a bore side and a shell side;
    an inner current collector and an inner electrocatalyst structure at the bore side of said hollow microfibrous membrane separator; and
    an outer current collector and an outer electrocatalyst structure at the shell side of said hollow microfibrous membrane separator,
wherein the inner current collector comprises the fibrous article of claim 30.

36. The microfibrous fuel cell of claim 35, wherein said metal core has a cross-sectional outer diameter within a range of from about 10 μm to about 10 mm.

37. A method for producing a metal clad fiber having (i) a metal core containing copper and (ii) at least one metal protective layer bonded together by solid phase bonding and containing any of titanium and nickel, the method including the steps of:

forming a precursor structure having a longitudinal axis, said metal core, at least one metal protective layer disposed over the metal core, with at least one removable metal component partially embedded in at least one of said at least one metal protective layer and partially exposed on a surface of said precursor structure, wherein said metal core and said at least one metal protective layer are bonded together along respective interfaces by solid-phase bonding, and wherein said removable metal component extends along the longitudinal axis; and drawing the precursor structure into a fibrous structure; and selectively removing the removable metal component from said fibrous structure, in such manner that the metal core and the one or more protective metal layers form a metal clad fiber that has one or more surface channels extending along directions that are substantially parallel to the longitudinal axis of the metal clad fiber.

* * * * *